C. KIRCHHOF.
CANDLE-HOLDER.
No. 7,652. Reissued May 1, 1877.
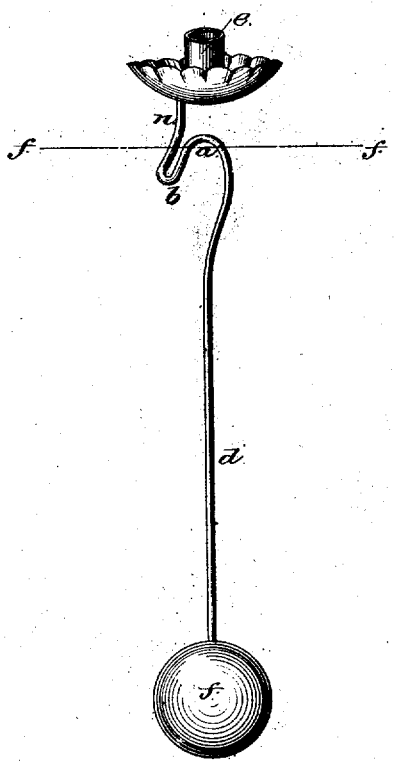
Attest:
Charles F. Doepel.
August Heinger
Inventor:
Charles Kirchhof

UNITED STATES PATENT OFFICE.

CHARLES KIRCHHOF, OF NEWARK, NEW JERSEY.

IMPROVEMENT IN CANDLE-HOLDERS.

Specification forming part of Letters Patent No. 72,506, dated December 24, 1867; reissue No. 6,805, dated December 14, 1875; reissue No. 7,652, dated May 1, 1877; application filed March 8, 1877.

*To all whom it may concern:*

Be it known that I, CHARLES KIRCHHOF, of Newark, in the county of Essex and State of New Jersey, have invented a new and Improved Candle-Holder for Christmas-Trees, of which the following is a specification, reference being had to the accompanying drawings.

The nature of my invention consists in the construction of an arrangement for conveniently attaching the candles or ornaments or other objects to and maintaining them above the oscillating branches of the tree in their proper position.

I will now proceed to describe my construction and operation.

The construction of my device is based upon the principle of a counterbalanced pendulum.

A hook, *a b*, as shown in the drawing, and made of the required material, may be so arranged as to be conveniently attached, either by the curved part *a* or the point *b*, to the supporting branch *s s*, and easily removed again. To this hook is attached the candle-holder *e*, or any other object desired, either by means of the short part *n*, extending upward, as shown in the drawing, or in any other suitable manner allowing the proper operation.

The hook *a b* is also provided with the rod *d*, to the lower end of which may be attached, in a suitable manner, the weight *f*, which may consist of a ball, fruit, or any other object of sufficient gravity for successful operation.

It is obvious that my improvement may consist of one or more pieces of a variety of materials, if arranged in substantially the manner above described.

Having described my invention, I will now state what I desire to secure by Letters Patent.

I claim—

As an improved article of manufacture, the candle-holder *e*, in combination with the hook *a b* and rod *d*, arranged to connect with a suitable weight, *f*, in the manner and for the purposes substantially as described.

CHARLES KIRCHHOF.

Witnesses:

CHARLES F. DAEPEL,

AUGUST HUNGER.